US006421904B1

(12) United States Patent
Wedekind et al.

(10) Patent No.: US 6,421,904 B1
(45) **Date of Patent: *Jul. 23, 2002**

(54) TEMPLATE FOR REMODELER LIGHTING APPLICATION AND METHOD OF USE

(75) Inventors: Robert James Wedekind, Riverside, RI (US); Mark Owen Jones, South Dartmouth; Graham Michael Rippel, South Easton, both of MA (US)

(73) Assignee: Genlyte Thomas Group LLC, Louisville, KY (US)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 08/997,004

(22) Filed: Dec. 23, 1997

Related U.S. Application Data

(63) Continuation-in-part of application No. 08/884,006, filed on Jun. 27, 1997, now Pat. No. 5,957,572.

(51) Int. Cl.[7] .................... B23P 11/00

(52) U.S. Cl. .................... 29/432; 29/872; 29/828; 362/365; 362/148

(58) Field of Search .................... 29/872, 857, 825, 29/828, 854, 432; 362/365, 407, 150, 147, 148; 33/27.07, 27 C, 27.01, DIG. 10, 565; 7/163; 83/14, 33, 54; 220/3.5, 3.3, 3.9

(56) References Cited

U.S. PATENT DOCUMENTS

| | | | | | |
|---|---|---|---|---|---|
| D221,684 | S | * | 8/1971 | Martel et al. | |
| 4,096,964 | A | * | 6/1978 | Glick | 220/3.4 |
| 4,129,948 | A | * | 12/1978 | Hatter et al. | 33/27 C |
| 4,209,103 | A | * | 6/1980 | Glovier | 220/3.4 |
| 4,313,154 | A | * | 1/1982 | Capostagno et al. | 362/365 |
| 4,335,511 | A | * | 6/1982 | Bowling | 30/366 |
| 4,345,381 | A | * | 8/1982 | Brislin | 33/174 G |
| 4,388,890 | A | * | 6/1983 | Wester et al. | 116/204 |
| 4,503,489 | A | * | 3/1985 | Duerr et al. | 362/147 X |
| 4,582,737 | A | * | 4/1986 | Torgerson et al. | 428/57 |
| 4,646,212 | A | * | 2/1987 | Florence | 362/150 |
| 4,989,334 | A | * | 2/1991 | DuBose, Jr. | 33/365 |
| 5,031,084 | A | * | 7/1991 | Russo et al. | 362/365 |
| 5,130,185 | A | * | 7/1992 | Ness | 428/40 |
| 5,222,800 | A | * | 6/1993 | Chan et al. | 362/147 |
| 5,317,493 | A | * | 5/1994 | Muller et al. | 362/407 |
| 5,374,812 | A | * | 12/1994 | Chan et al. | 220/3.6 |
| 5,452,816 | A | * | 9/1995 | Chan et al. | 220/3.8 |
| 5,681,630 | A | * | 10/1997 | Smick et al. | 428/40.1 |
| D397,044 | S | * | 8/1998 | Le | D10/64 |
| 5,912,369 | A | * | 6/1999 | Reeves | 55/385.1 |

* cited by examiner

*Primary Examiner*—Peter Vo
*Assistant Examiner*—Minh Trinh
(74) *Attorney, Agent, or Firm*—Jeffrey A. Haeberlin; Middleton Reutlinger

(57) ABSTRACT

A method for using a template to cut an aperture in a planar member at the point where a fixture is to be installed by positioning the template on the planar member and cutting the planar member about the edge of the template.

10 Claims, 9 Drawing Sheets

TEMPLATE FOR REMODELER LIGHTING APPLICATION AND METHOD OF USE

RELATED APPLICATIONS

This application is a continuation-in-part of U.S. patent application Ser. No. 08/884,006, filed Jun. 27, 1997, which is U.S. Pat. No. 5,957,572 issued Sep. 28, 1999 the disclosure of which is herein incorporated by reference.

BACKGROUND OF THE INVENTION

The present invention relates in general to remodeler light fixtures or other devices installed in the walls and/or ceilings of buildings having support structures and methods of installing the support structures. More particularly, it relates to simple and reliable remodeler light fixture support structures and methods of installing same in areas having limited, if any, access from above or behind the light fixture. Even more particularly, it relates to light fixture support structures that may be attached without tools and which meet Underwriters Laboratory (UL) standards and building codes. Most particularly, it relates to a template having an adhesive means for properly positioning and sizing an aperture in a planar member and methods of properly positioning and forming an aperture in planar members using the template.

Various methods, systems and apparatuses for installing lighting fixtures or other devices in existing construction, as opposed to new construction, have been developed and practiced by the construction industry. Examples of prior systems and apparatuses for installing lighting fixtures in existing construction in the field of the present invention include those described in patents of the assignee of the present application: U.S. Pat. No. 5,031,084; 5,317,493; 5,222,800; 5,374,812; 5,452,816 and 4,646,212. Additionally, U.S. Pat. No. 2,454,119 is related to the subject matter of the present application. These patents are representative of patents directed to the subject matter of the present application.

The prior art constructions and methods all have disadvantages in that, they have a plurality of parts requiring assembly to the structure often requiring the installer to use tools, including simple hand tools, during installation. Further, with the prior art constructions, installers are unable to separate the mechanical portion from the electrical portion of the installation, often requiring a qualified electrician to perform the entire installation rather than allowing a lesser skilled worker to install the mechanical portion and an electrician to install the electrical portion at a later time. These prior remodelers often comprised multiple unattached components and, thus, there is the possibility that unattached structural components might become separated from the fixture during the installation. When the unattached structural components fall during installation in a ceiling, the installer has to go down the ladder to retrieve the fallen components. Thus, the prior remodelers are more complicated than just a simple unitary part that the installer can hold in one hand while climbing a ladder.

These prior remodeler fixtures and methods are somewhat inadequate when used in "rough-in" sections which allow contractors to do the mechanical and the electrical work required to finish the installation of a new light fixture in an existing construction. In the installation method typically used in remodeling applications, the trim installation, or the installation of the light fixture itself, is usually accomplished after painting and other mechanical alterations are made in the space. The trim merely finishes the installation of the light fixture.

Another problem with the prior remodelers relates to accurately positioning, sizing and forming the aperture in the planar member for receiving the specific remodeler light fixture support structure. Prior methods and devices for accurately positioning, sizing and forming the aperture for receiving the remodeler lighting fixture support structure included specialized hole cutting tools utilized by high volume installers for each of the 1,100 size, 1,000 size and 2,000 size remodeler light fixture support structures. These hole cutting tools are expensive and were subject to breakdown. Other methods of locating and sizing the aperture included tracing the outer edges of a cardboard template on the planar member and then using a saw to cut along the traced edges. The cardboard template tracing method was used by individuals or tower volume installers unable or unwilling to pay the high price for the specialized hole cutting tools.

SUMMARY OF THE INVENTION

It is an object of the present invention to provide improved means and methods for positioning and properly sizing an aperture in planar members.

Another object of the present invention is to provide improved methods, systems and apparatuses for accurately locating and sizing an aperture in a planar surface.

Still another object of the present invention is to provide a template having an adhesive means on one side for accurately positioning an aperture in a planar member.

A further object of the present invention is to provide a template for marking the position on the surface of a planar member where an aperture is to be cut by adhering to the planar member.

A still further object of the present invention is to provide a template once adhered to a planar member for guiding an installer in forming an aperture in the planar member.

In accordance with the present invention, one representative article of manufacture for locating and sizing an aperture to be formed in a planar member, the article comprising: a template having written indicia on one side and an adhesive means on the other side; and a backing member, operatively positioned in contact with the adhesive means, for maintaining the effectiveness of the adhesive means until removal of the backing member from contact with the adhesive means.

In accordance with the present invention, a representative template comprises a thin means having written indicia operatively positioned on one side and an adhesive means operatively positioned on the other side.

In accordance with the present invention, one representative method for forming an aperture in a planar member having an inner and an outer surface, the method comprising the steps of: providing a template including a center aperture, written indicia on one side and an adhesive material on the other side and a backing member; separating the template having the adhesive applied thereto from the backing; positioning a mark placed on the planar member for indicating the center of the position where the aperture is to be cut; positioning the template with the adhesive portion facing the planar member such that the mark shows through the center aperture of the template; and cutting the planar member about the edge of the template.

In accordance with the present invention, one representative method for installing a fixture in a planar member comprising the steps of: determining the location where an aperture is desired to be formed in the planar member;

positioning a template having written indicia on one side and an adhesive means on the other side at the location where an aperture is desired to be cut in the planar member; forming an aperture at the point where the fixture is to be installed by cutting around the edge of the template; positioning a fixture support structure having a perimeter and a lip having an inner and an outer surface in the formed aperture; operatively positioning at least two means about the perimeter of the fixture support structure for retaining the fixture support structure in position in the aperture formed in the planar member; positioning the fixture support structure in the aperture; positioning the at least two retaining means contiguous with the inner surface of the planar member; and manipulating the at least two retaining means such that the fixture support structure is maintained in position in the aperture by clamping the planar member between the lip portion of the perimeter member and the retaining means.

Other objectives and advantages of the present application will become apparent from the following description, the accompanying drawings and the appended claims.

BRIEF DESCRIPTION OF THE DRAWINGS

FIG. 4 is an enlarged sectional view of a slot used to hold a retaining member of the perimeter member of ; FIG. 1;

FIG. 12 illustrates the support structure of the present invention being installed in a cut hole or aperture in a planar member or ceiling;

FIG. 13 illustrates the installer moving the mounting strap into contact with the inner surface of the planar member to clamp the planar member (ceiling) between the mounting strap and the lip of the planar perimeter member of the support structure;

FIG. 14 illustrates the mounting strap of FIG. 13 after the installer has properly positioned the mounting strap;

FIG. 15 illustrates the connection of the wiring to a junction box;

FIG. 16 illustrates the connection of the junction box tab with the perimeter member of the support structure;

FIG. 17 illustrates the position of the junction box relative the planar member (ceiling) once connected to the perimeter member;

FIG. 18 illustrates the completed lighting fixture installed in the aperture according to the present invention.

DETAILED DESCRIPTION OF THE INVENTION

Figure 1:
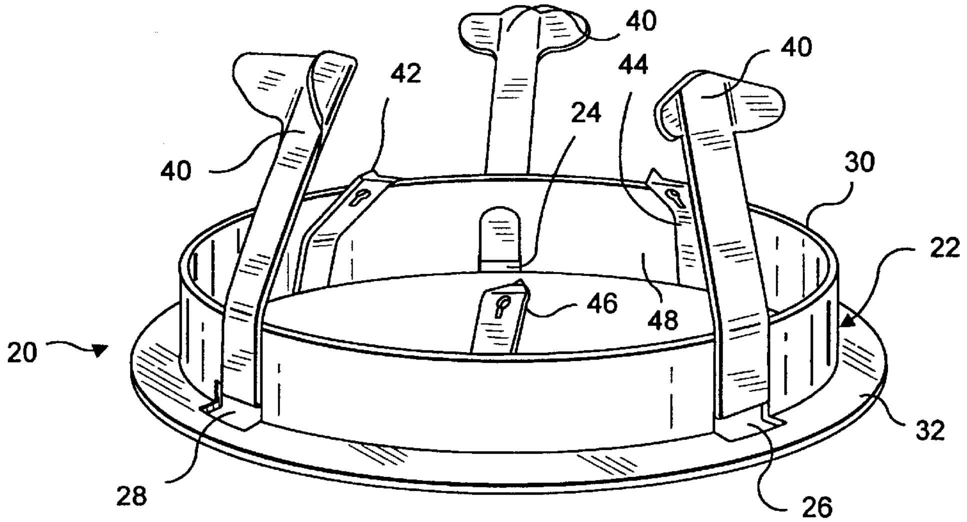
FIG. 1 is a perspective view illustrating a remodeler light fixture support structure according to the present invention.

In carrying out the present invention in preferred forms thereof, we have provided improved methods, systems and apparatuses for installing a fixture, such as, for example, a light fixture in existing construction in a manner that significantly reduces installation time and facilitates flexible contractor scheduling in that the. mechanical and the electrical portions of the installation can be readily accomplished at different times by different personnel. The methods, systems and apparatuses of the present invention are simple, versatile, flexible, low maintenance, cost effective, require no specialized tools and are space efficient. The methods, systems and apparatus of the present invention include unique combinations of elements and steps that facilitate the installation of a remodeler light fixture by using an adhesive template for positioning and sizing an aperture for receiving a support structure having clamp means operatively connected thereto.

FIGS. 1–18 illustrate a representative new remodeler light fixture support structure and new methods of installing the remodeler light fixture in the support structure. As shown in FIGS. 1–8, the remodeler light fixture support structure 20 includes a perimeter member 22 having at least two, and preferably three, slots 24, 26, 28 operatively formed therein. The perimeter member can be circular or of any other geometric shape which corresponds to the shape of a desired light fixture. Specifically, the perimeter member can be shaped as desired, such as, for example, square, rectangular, elliptical, pentagonal, etc.

As shown in FIGS. 1–5, the perimeter member comprises a wall portion 30 and a lip portion 32 (the lip portion may be continuous or segmented) formed to protrude outwardly from the wall portion 30 and, as illustrated, the perimeter member is circular and has the preferred three slots 24, 26, 28 formed therein spaced about one hundred twenty (120°) degrees apart. These slots 24, 26, 28 are for receiving a light fixture support structure retaining means or a mounting strap 40. The details of the mounting strap 40 will be described below.

As shown in FIG. 1, three representative trim springs 42, 44, 46 (three trim springs are presently preferred for the 1000 and 2000 series remodelers and four trim springs presently preferred for the 1100 series remodeler) are operatively positioned about one hundred twenty (120°) degrees apart around the interior periphery 48 of the perimeter member 22 for centering the trim or the lighting fixture once the trim 50 (see FIG. 18) is installed into the perimeter member 22. It should be understood that more trim springs or other supporting means could be used, such as, for example, four (4) trim springs positioned about ninety (90°) degrees apart (1100 series remodeler). In fact, any number of trim springs or other supporting means could be used as long as they support the trim 50 in accordance with known conventional standards. The trim springs 42, 44, 46 are positioned on the inner periphery 48 of the perimeter member 22 such that the position of the trim springs 42, 44, 46 with respect to the trim 50 is constant regardless of the planar member 52 thickness. In other words, the distance from the lip portion 32 of the perimeter member 30 to the trim springs 42, 44, 46 is constant. If this distance were not constant, planner thickness would determine trim spring location. In that case, the thicker the planer material the farther away the trim springs would be located relative to the trim. If all trims were uniform along the side or vertical walls, this would not be a problem but the side walls of most trims are not uniform and actually curve inwardly thereby reducing the distance between the side walls.

Figure 3:
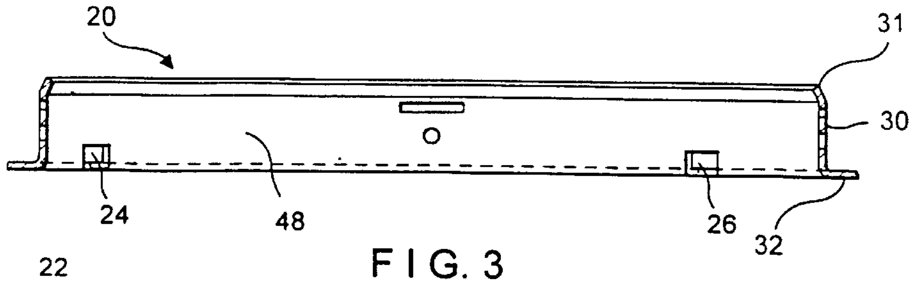
FIG. 3 is a sectional view of the perimeter member of FIG. 2 taken along line 3—3.
Figure 4:
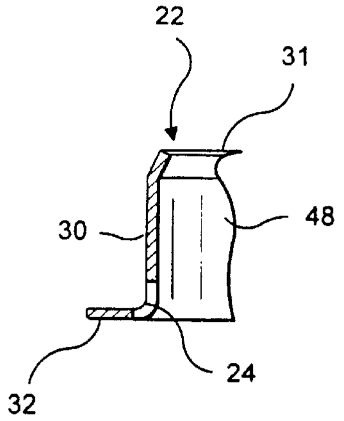

As shown in FIGS. 3 and 4, because the mounting straps 40 interact with the perimeter member 22 in a specific manner, the slots 24, 26, 28 are formed in perimeter member 22 at the junction between the wall portion 30 of the perimeter member 22 and the lip portion 32. The wall portion 30 is, presently preferably, about 0.75 inch high and has a tip 31 at one end which is, presently preferably, bent at about a fifteen (15°) degree angle toward the interior portion of the perimeter member 22. The lip portion 32 is formed to protrude outwardly from the wall portion 30. The lip portion 32 extends outwardly from the wall portion 30 at about a ninety degree (90°) angle therewith. The slots 24, 26, 28 for receiving the mounting straps 40 are positioned in the curved portion of the perimeter member 22 between the lip portion 32 and the wall portion 30 with the dimensions of the lip portion from the interior surface of the perimeter member 22 toward the end of the lip portion most remote from the wall portion 30 being about, presently preferred, 0.10 inch and the dimensions of the portion of the slot 24 from the surface of the lip portion 32 most remote from the angled tip 31 of the perimeter member 22 being about 0.15 inch toward the angled tip 31. The width of the slots 24, 26, 28 is, presently preferred, about 0.41 inch.

Figure 5:
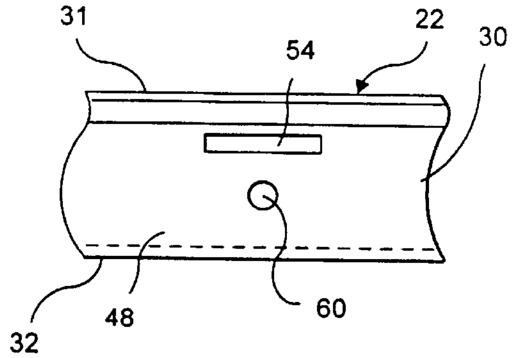
FIG. 5 is an enlarged view of the portion of the perimeter member where a spring member for holding the trim is attached to the perimeter member.

As shown in FIG. 5, one additional slot 54 and related aperture 60 for operatively positioning the trim springs 42, 44, 46 (see FIG. 1) are formed in the perimeter member 22 with the circular aperture being located about 0.281 inch from the lower surface of the lip portion 32. The about 0.093 inch by about 0.510 inch slot 54 is positioned about 0.220 inch above the center radius of the 0.136 radius aperture 60 toward the angled tip 31, of the wall portion 30 of the perimeter member 22.

It should be understood that all part dimensions are for illustrative purposes and that those skilled in the art could easily determine appropriate dimensions for a plurality of possible support structures to meet a plurality of different application requirements.

Figure 2:
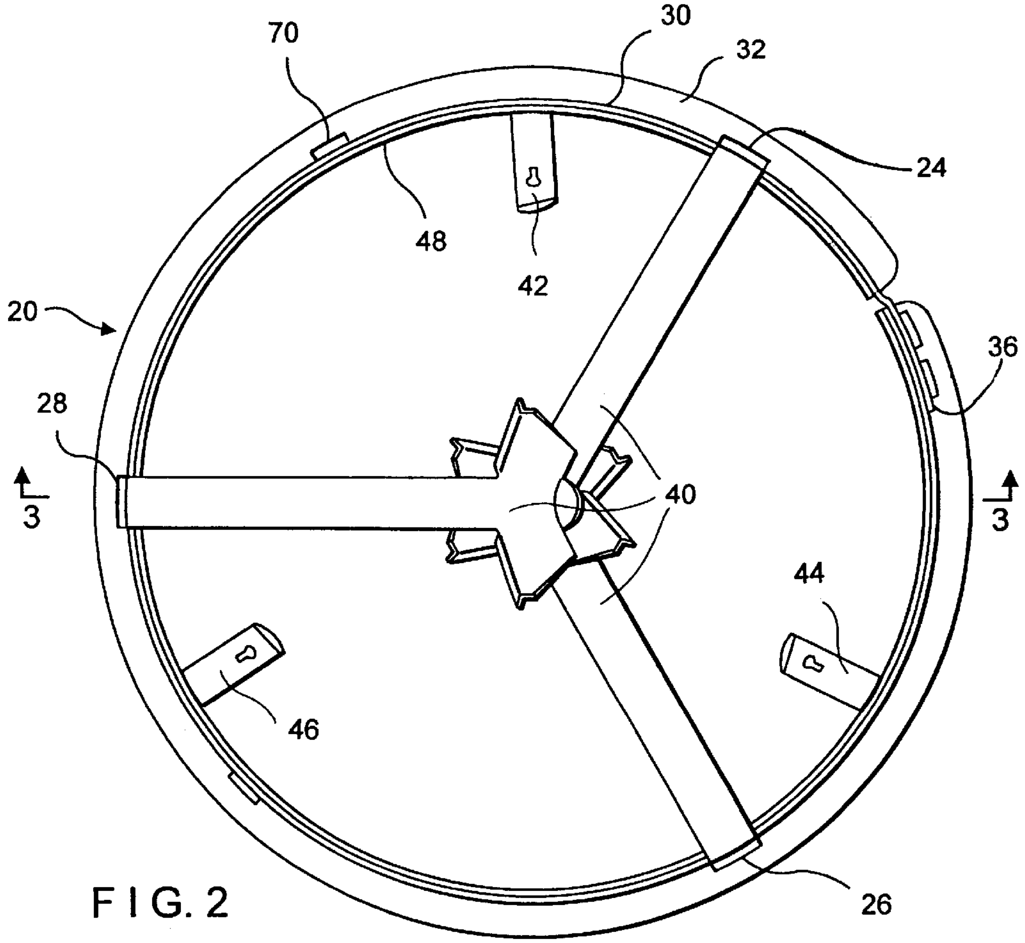
FIG. 2 is a top view illustrating the perimeter member of the support structure of FIG. 1.

As illustrated in FIGS. 2 and 3, the perimeter member 22, is conventionally formed from about 0.032 inch thick C-1011 or C-1008 hot dipped galvanized G-60 minimum spangle, matte finish commercial quality metal. The perimeter member 22 can be either formed as a continuous member or formed by rolling such that there is an overlap connecting portion 36. The overlap 36 between ends of the perimeter member 22, is presently preferred, a minimum of about one (1) inch. The overlapping portion 36 is operatively connected in a conventional way such as, for example, by interlocking one overlapping thickness of the material into the other by a patented process known as "TOG-L-LOK." Alternative connecting methods include, but are not limited to, welding, riveting, using a tab and slot connection, adhesive, nuts and blots, screws, etc. When using three mounting straps 40 and four trim springs, the minimum angle between a mounting strap slot and a slot for the trim spring is presently preferably about thirty (30°) degrees.

Figure 16:
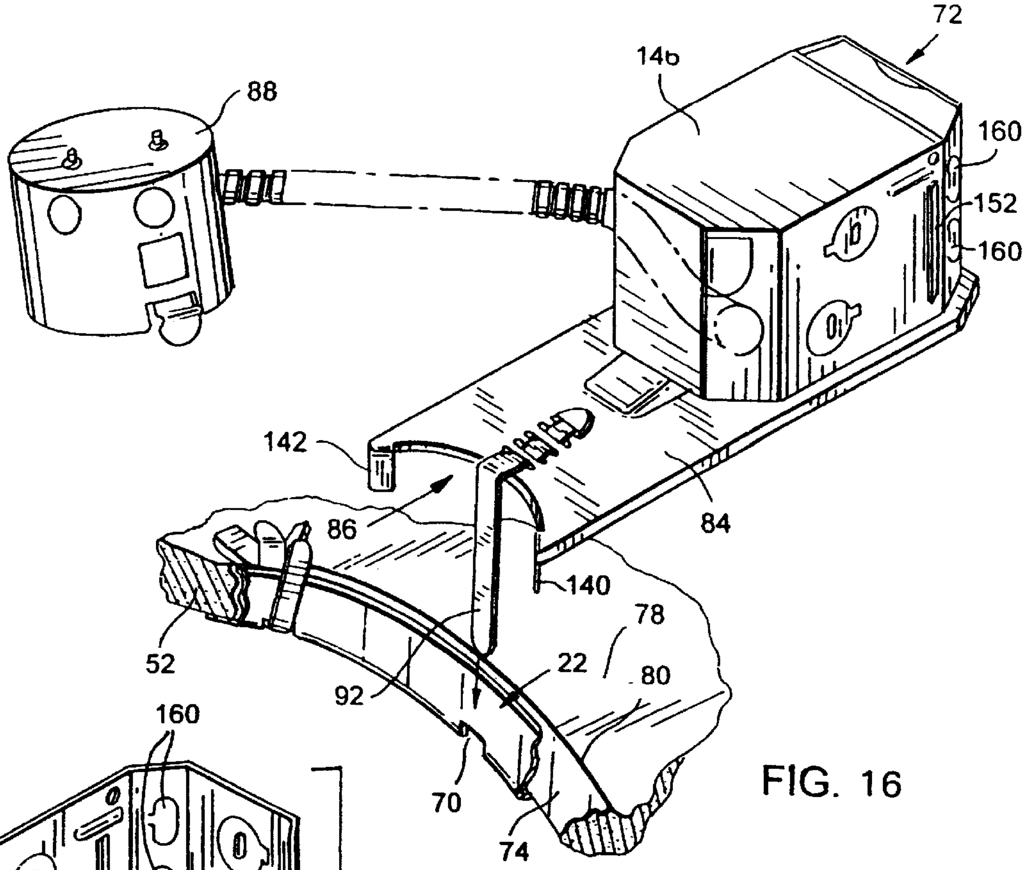

As shown in FIGS. 2 and 16, a single slot 70, relatively smaller than the mounting strap slots 24, 26, 28, is also operatively formed in the perimeter member 22. This smaller slot 70 facilitates the accurate assembly of the support structure 20 at the factory and is used for securing a junction box 72 (as will be described later) in position proximal an opening or aperture 74 in a planar member 52. The position of the junction box 72 relative to the aperture 74 must be accurate so that a thermal probe 76, for detecting properly placed installation (not shown), is automatically and repeatedly installed at the required height off the ceiling or planar member 52. The junction box 72 must be accurately and securely positioned on the surface 78 of the planar member 52 relative to the trim 50 positioned in the aperture 74 such that the junction box 72 is prevented from overhearing. In other words, the junction box 72 must be reliably installed at a constant, predictable distance from the edge 80 of the aperture 74 in order to prevent junction 72 malfunctions. Thus, it is important to repeatedly, consistently and predictably position the junction box 72 so that when tested, all requirements for Underwriters Laboratories (UL) and building codes are met.

An important component of the junction box 72 is a base plate 84 having a lip 86 for positioning the junction box 72 relative to the aperture 74 in the planar member 52 regardless of the size of the standard light fixture aperture 74 that is cut. The length of the base plate 84 should be sufficiently long to properly position the thermal probe 76 relative to the installed trim 50. A socket 88 is conventionally operatively connected to the junction box 72.

Figure 11:
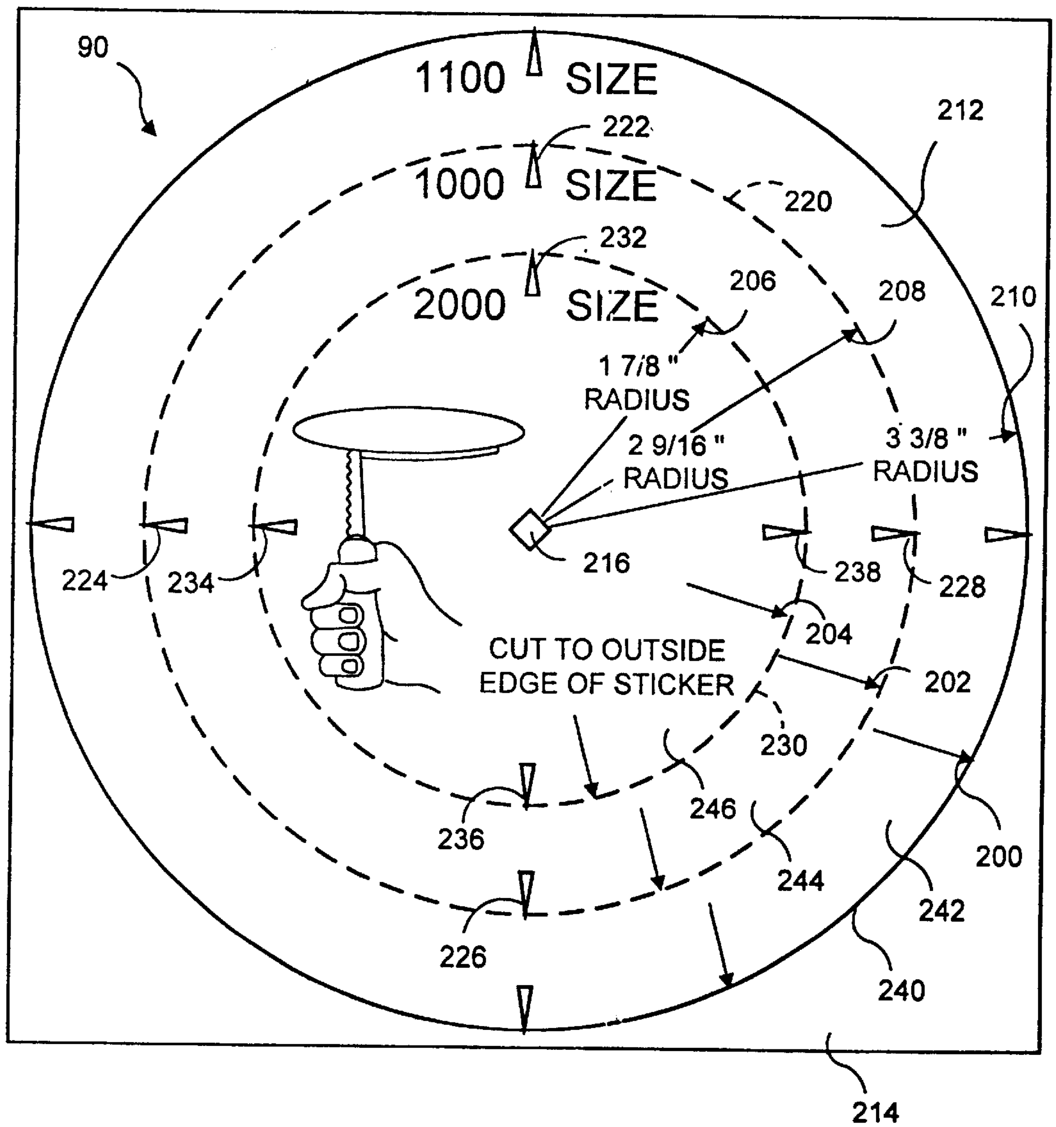
FIG. 11 is a plan view of a template usable with the present invention.

In an effort to assist the installer of the remodeler lighting fixture, the installation system includes a template 90 having the three standard sizes (1,100, 1,000, and 2,000) for remodeler lighting fixtures depicted thereon. Specifically, as illustrated in FIG. 11, one representative template 90 includes indications 200, 202, 204 for where the lighting fixture installer should cut the planar surface to install the remodeler lighting fixture. Size 2,000, 1,000 and 1,100 lighting fixtures having a radius of 1⅞ inches, 206, 2$\frac{9}{16}$ inches, 208 and 3⅜ inches, 210 respectively are depicted on the template 90. The template 90 includes detailed instructions for the installer concerning the size aperture 74 or hole to cut in the planar member 52 for each specific size lighting fixture.

The template 90, presently preferably, comprises a circular relatively thin piece of paper 212 or other material capable of performing the functions of the template 90 and of having printed indicia permanently or semi permanently placed thereon. The template 90 includes an adhesive means (not shown) on the side opposite the printed indicia. Any adhesive means that is operative to maintain the template 90 in place on the planar member 52 until the aperture 74 has been formed is acceptable. An acrylic pressure sensitive adhesive commercially available from Fasson Corporation is the presently preferred adhesive means used with the representative template. The template 90 has a protective backing 214 supplied with the template 90 covering the side of the template having the adhesive means. The protective backing 214 enables the adhesive on the backside of the template 90 to retain its adhesive properties until the template 90 is ready to be applied to a surface of a planar member 52.

To assist in the proper location of a template 90 and subsequently the proper and accurate location of the aperture 74 that is cut in the planar member 52 utilizing the template 90, a hole 216, presently preferably about 0.20×about 0.20 inch square, is formed in the center of the template 90. This hole 216 is typically utilized to guide the installer to position the template 90 where the template is to be adhered to the planar member 52 so that the aperture 74 will be accurately cut in the planar member 52.

At a radius of about 2⁹⁄₁₆ inches from the center of the hole 216 formed in the center of the template 90, a first set of perforations or slits 220 are positioned in the template 90 but not through the backing 214. These perforations 220 are provided along with material webs for maintaining the integrity of the template 90. The material webs are positioned, presently preferably at four positions, about ninety (90°) degrees apart, as shown by the arrowheads 222, 224, 226, 228 in FIG. 11. Further, at least one additional set of perforations 230 with similar material webs located at the arrowheads 232, 234, 236, 238 are formed in the template 90 at about a radius of 1⅞ inches from the center hole 216.

The perforations 220, 230 divide the template 90 into three portions. The outer edge 240 of the template 90 to the first set of perforations 220 constitutes an outer portion 242. A middle portion 244 is formed by the area between the first set of perforations 220 formed at a radius of about 2⁹⁄₁₆ inches from the center and the set of perforations 230 formed at a radius of about the 1⅞ inches from the center 216 of the template 90. The inner portion 246 is the portion from the hole 216 in the center of the relatively thin paper template to the second set of perforations 230. The significance of the perforations 220, 230 and the three portions 242, 246, 248 will be described in detail later.

It should be understood that the location of the perforations on the template are illustrative only and that other locations for the sets of perforations in the template 90 could be used for applications other than the specific remodeler light fixture described. Further, the template 90 and the perforations shown could be formed in shapes other than circular, including but not limited to, square, rectangular, elliptical or other geometric shapes corresponding to the shape of an aperture to be formed in a planar member.

Figure 6:
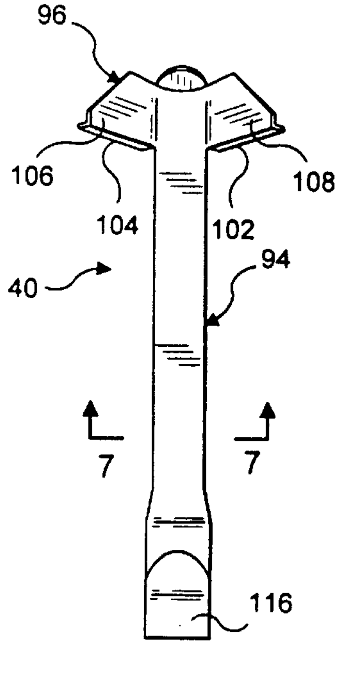
FIG. 6 is a perspective view of a retaining member according to the present invention.
Figure 7:
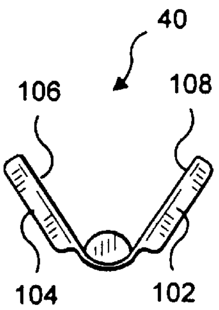
FIG. 7 is a view of the double winged end of the retaining member of FIG. 6 taken along line 7—7.
Figure 8:
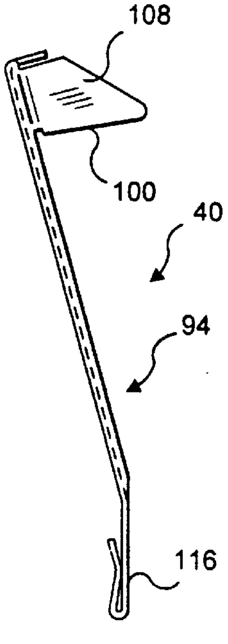
FIG. 8 is a side view of the retaining member of FIG. 6.
Figure 9:
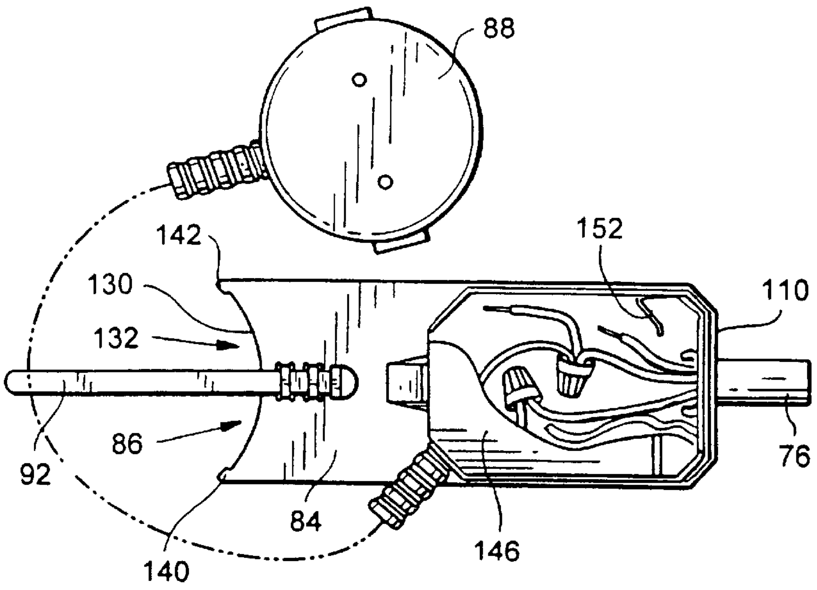
FIG. 9 is a top view of the junction box and socket according to the present invention.
Figure 10:
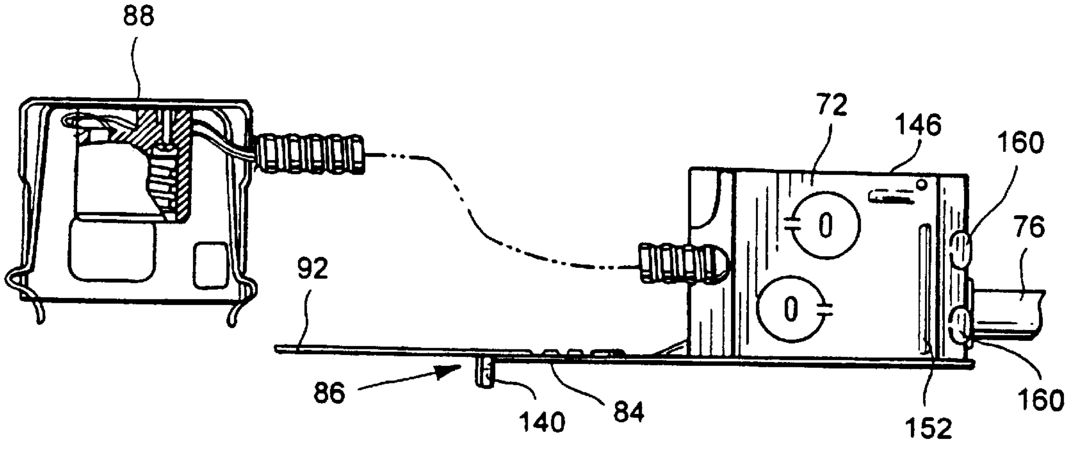
FIG. 10 is a side view of the junction box of FIG. 9.

As specifically shown in FIGS. 6–8, the mounting strap 40, as used in the support structure 20 and methods of the present invention, is, presently preferably, a thin, long flat member 94 having a hook portion 116 at one end and a v shaped two leg member 96, with each of the legs 106, 108 having a flange 102, 104 for engaging the surface 78 of the planar member 52 at the other end. The portion between the two legs 106, 108 and the hook end 116 is, presently preferably, about three (3.0) inches long, about 0.018 inch thick and about 0.37 inch wide. In any event, the length of the flat member 94 should be sufficient to cover any thickness of planar member 52 or ceiling likely to be encountered.

AS illustrated in FIG. 7, the two legs 106, 108 are positioned at about, presently preferably, sixty (60°) degrees with respect to each other. Connected to each leg 106, 108 presently preferably, at about a ninety five (95°) degree angle therewith are the flanges 102, 104, which are about 0.14 inch wide and about 0.625 inch long. These flanges 102, 104 are the part of the mounting strap 40 which contact the inner surface 78 (see FIG. 14) of the planar member 52 and distribute the weight of the remodeler light fixture such that the structural integrity of the material of the planar member 52 is not penetrated or broken down by the weight of the fixture. In short, the flanges 102, 104 distribute the weight of the light fixture over a larger surface area of the planar member 52 than those of the prior art thereby avoiding complete reliance on the structural integrity of the planar material, such as, for example, how thick or how thin the planar member 52 is at any given point, for bearing the full weight of the light fixture at only a few sharp points of contact. The ninety five (95°) degree angle between the legs and the flanges provide a tighter, more secure installation.

Additionally, these flanges 102, 104 are the components which either dig into the planar member 52 or raise off the planar member 52 during attempted rotation of the support structure 20 when an installer or whatever attempts to rotate the support structure 20, as will be described below. It should be understood that dimensions of the flanges 102, 104 can vary and that the flanges illustrated were developed to meet a specific physical test of installation.

The angle of the connection between each leg 106, 108 and the long flat member 94 should be greater than about ninety (90°) degrees because of the potential that the mounting strap will slide away from the planar material when the mounting strap is pulled down into contact with the planar member 52. The angle of the connection between each leg 106, 108 and the respective flange 102, 104 should preferably be about ninety (90°) degrees but less than about one hundred seventy (170°) degrees because the closer the angle between the leg and the flange is to one hundred eighty (180°) degrees, the smaller the surface area of the flange contacting the planar member 52 for distributing the weight of the fixture.

Figure 13:
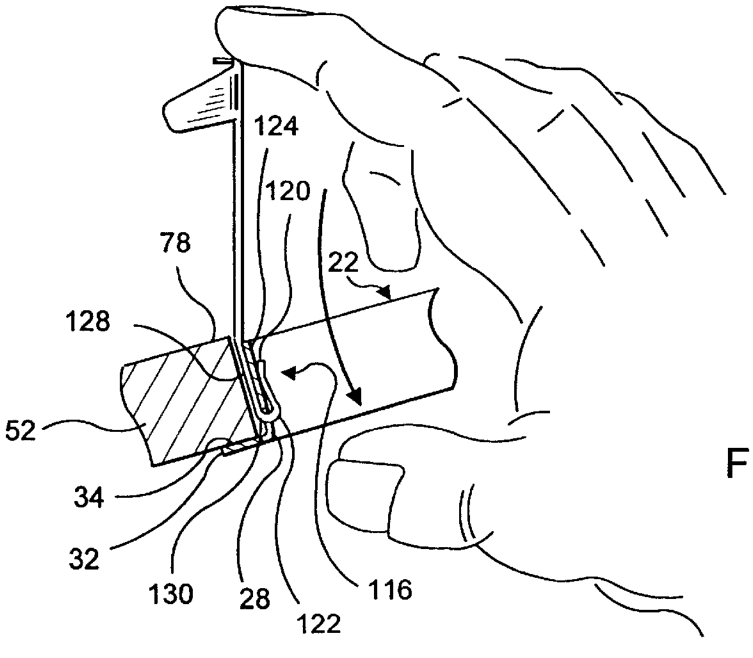

The hook portion 116 of the mounting strap 40 is designed for holding the mounting straps 40 in a specific position in the perimeter member 22 after leaving the factory and before the support structure 20 is installed in an aperture 74 in a planar member 52. As illustrated in FIGS. 1 and 13, when the mounting straps 40 are initially located in the slots 24, 26, 28 of the perimeter member 22, the inner surface 120 of the hook portion 116 is in contact with the inner surface 122 of the perimeter member 22 and the inner surface 124 of the mounting strap flat member 94 is contiguous with the outer surface 128 of the perimeter member 22 with the connecting portion 130 of the hook 116 being pulled contiguous with the portion of the mounting strap slots 24, 26, 28 placed therebetween. After assembling in this manner, the mounting straps 40 can be bent into position and nested in the center of the perimeter member 22. In this nested position, a plurality of light fixture support structures 20 can be efficiently packaged for shipment and distribution to end users.

One important element of the present invention is the light fixture support structure retaining means or mounting strap 40 which, when properly positioned in the, at least two and preferably three, slots 24, 26, 28 formed in the perimeter member 22 of the support structure 20, provides for the distribution of the weight of the installed lighting fixture such that the structural integrity of the planar member 52 is maintained. The mounting straps 40 include means for distributing the weight of the support structure 20 over a larger surface area of the surface 78 of the planar member 52 than those of the prior art and, thus, allows the lighting fixture to be installed in planar members having less than optimal structural integrity such as, for example, ceiling tile.

As shown in FIG. 8, in addition to distributing the weight of the lighting fixture or trim 50 over the surface 78 of the planar member 52, the mounting strap 40 of the present invention is designed to prevent the support structure 20 from rotating in the planar member 52. Specifically, it is undesirable to have the support structure 20 rotate in the aperture 74 in the planar member 52 when installing the trim or when installing incandescent light bulbs, etc. Therefore, the surface 100 of the mounting strap flange 102, 104 in contact with the planar member 52 "digs into" the surface 78 of the planar member 52 that they contact whenever there is an attempt to rotate the support structure 20 positioned inside the aperture 74 of the planar member 52. When attempting to rotate the support structure 20, one of the legs 106, 108 of at least one of the preferably three mounting straps 40 digs into the planar member 52. Specifically, the forward leg in the direction of rotation "digs in" while the rear leg is slightly raised into the air above the surface 78 of the planar member 52 during attempted rotation.

As shown in FIGS. 9, 10, 15–17 and 19, a unique junction box 72 and the associated socket 88, useful with the systems apparatus and methods of the present invention includes a base plate 84 having a tab or tongue 92 operatively connected thereto. The base plate 84 has the tab or tongue 92 at one end 130 and the unique junction box 72 including the thermal probe 76 at the other end 110. The tab 92 is connected at the end 130 of the base plate 84 most remote from the junction box 72. At the end 130 most remote from the junction box 72, the base plate 84 has an arched portion 132 with, presently preferred, two feet 140, 142, formed at the end thereof. The feet 140, 142 are formed respectively at each end of the arched portion 132 and at about a ninety degree (90°) angle with the plane of the base plate 84. The feet 140, 142 are for interacting with the aperture 74 formed in the planar member 52 and cooperating with the base plate 84 and the tab 92 to insure that the junction box 72 when connected to the support structure 20 perimeter member 22 and with the feet in the aperture 74, is accurately positioned relative the aperture 74 such that all applicable regulations and codes are met (see FIGS. 16–18). The feet 140, 142 and the tab 92 combine to prevent the base plate 84 from changing locations/positions on the surface 78 of the planar member 52 (ceiling) once installed, therefore insuring that the junction box 72 remains in the installed position.

Figure 19:
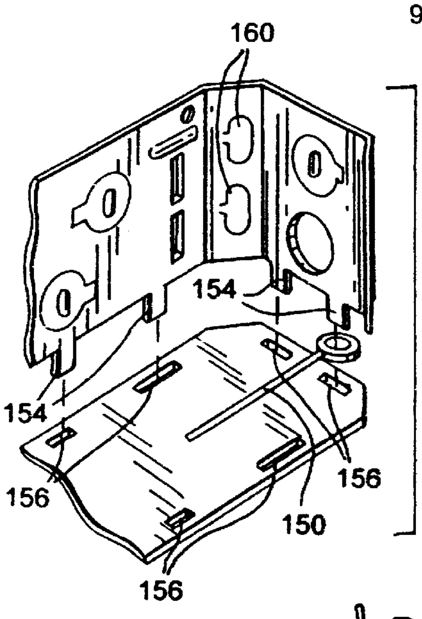
FIG. 19 is a partial perspective view of the sidewalls and the baseplate assembly of the junction box of FIGS. 9 and 10 according to the present invention.

The new unique eight sided (including an access door or cover 146 when closed) junction box 72 is specially constructed with minimal gage material. The junction box has a specifically designed access door 146 and a grounding wire 150 (see FIG. 19) which is uniquely attached to the box 72. An integral electrical cable clamp 152 operatively positioned inside the junction box requires no tools for electrical cable attachment thereto while being able to pass requisite testing. Specifically, the internal volume of the junction box is about twenty-one (21) cubic inches. This internal volume is believed to be the optimum size for accommodating the number of electrical wires allowed to be inside a junction box of this type by code and regulation. The construction of the unique junction box includes optimization of the location of the thermal probe 76 and the incoming electrical wire and the strategic orientation of the flexible conduct to minimize the junction box's dimension so that the entire junction box can be installed into a 3¾ inch diameter aperture. The complete junction box assembly is accomplished without hardware, such as, for example, screws, rivets or other hardware. Specifically, as shown in FIG. 19, a plurality of tabs 154 and a plurality of slots 156 slots (tab and slot construction) are utilized along with a snap and lock hinged door 146. The junction box 72 provides optimal wiring and volume and is capable of being passed through a 3¾ inch diameter opening in a building surface or planar member 52.

As shown, the junction box of the present application is constructed of a minimal gauge material. In particular, the eight sided junction box of the present application is configured such that the interior space is optimized for both interior volume and for installation through an aperture in a planar member 52 approximately 3¾ inches in diameter, as mentioned above. The door 146 to the junction box is hinged at 158 and is captive. The door when opened swings open and, is captive, such that gravity holds it open without fasteners for easy access when connecting wiring within the junction box.

Another feature of the junction box concerns the connection of the ground wire 150 to the junction box during the junction box assembly process by placing the ground wire between a tab 154 of the eight sided wall member and between a slot 156 in the junction box plate 84 so that the ground wire 150 is securely connected to the junction box 72 (see FIG. 19). Access for non metallic sheathed cable (Romex) is through the hinged door versus a knockout detail of the prior junction boxes. During the connection of the cable, the hinged knockout 160 remains intact versus the knockout slug of the prior junction boxes and does not require any tools in order to open whereas the prior art required tools to pry open the knockout.

Finally, the cable clamp 152 hinged to the wall of the junction box in combination with the access hole 160 size in the wall of the junction box provides for fast and easy insertion of the sheathed cable and automatically adjusts for 12–14 gauge NM sheathed cable. Further, the cable clamp 152 enables the junction box to resist UL's 50 lb. pull test in one motion without having to use tools or having to perform a secondary action to clamp or fasten the sheathed cable. Specifically, the cable clamp is structured such that once the cable is inserted through a slot 162 in the clamp 152 and an attempt is made to pull the cable back out of the junction box, the cable clamp 152 pivots about the hinge thereby compressing the cable between the opposing sides of the slot 162 in the clamp 152 (strain relief feature).

When connecting wire(s) to the junction box, with the 1100 and 1000 series remodelers, the junction box can be hung temporarily from the perimeter member to assist with the wire connections. When connecting wire(s) to the junction box, an open hinged knockout 160 is opened and a wire, preferably non-metallic sheathed cable, is pushed through the knockout opening 160 and through the cable clamp 152.

Figure 14:
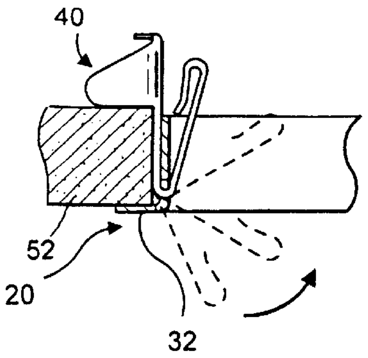

FIGS. 12–18 illustrate one method for installing a light fixture in existing construction using the illustrated circular light fixture support structure 20. First, an aperture 74 is cut in the planar member 52 at the desired location utilizing the template 90, as described above. Once the aperture 74 in the planar member 52 has been completed, the assembled support structure 20, including the preferred three mounting straps 40 and the trim springs 42, 44, 46, is inserted into the aperture 74. The light fixture installer holds the support structure 20 in position in the aperture 74, reaches in and pushes down on the mounting straps 40 (FIG. 13), preferably, one at a time until each mounting strap 40 contacts the inner surface 78 of the planar member 52 such that the planar member 52 is sandwiched between the mounting straps 40 and the inner surface 34 of the lip portion 32 of the perimeter member 22. As shown in FIG. 14, once each mounting strap 40 is in contact with the inner surface 78 of the planar member 52, the light fixture installer bends the mounting straps 40 and secures the support structure 20 in position in the aperture 74 effectively clamping the planar member 52 between the lip portion 32 of the perimeter member 22 and the retaining means or mounting strap 40.

Figure 15:
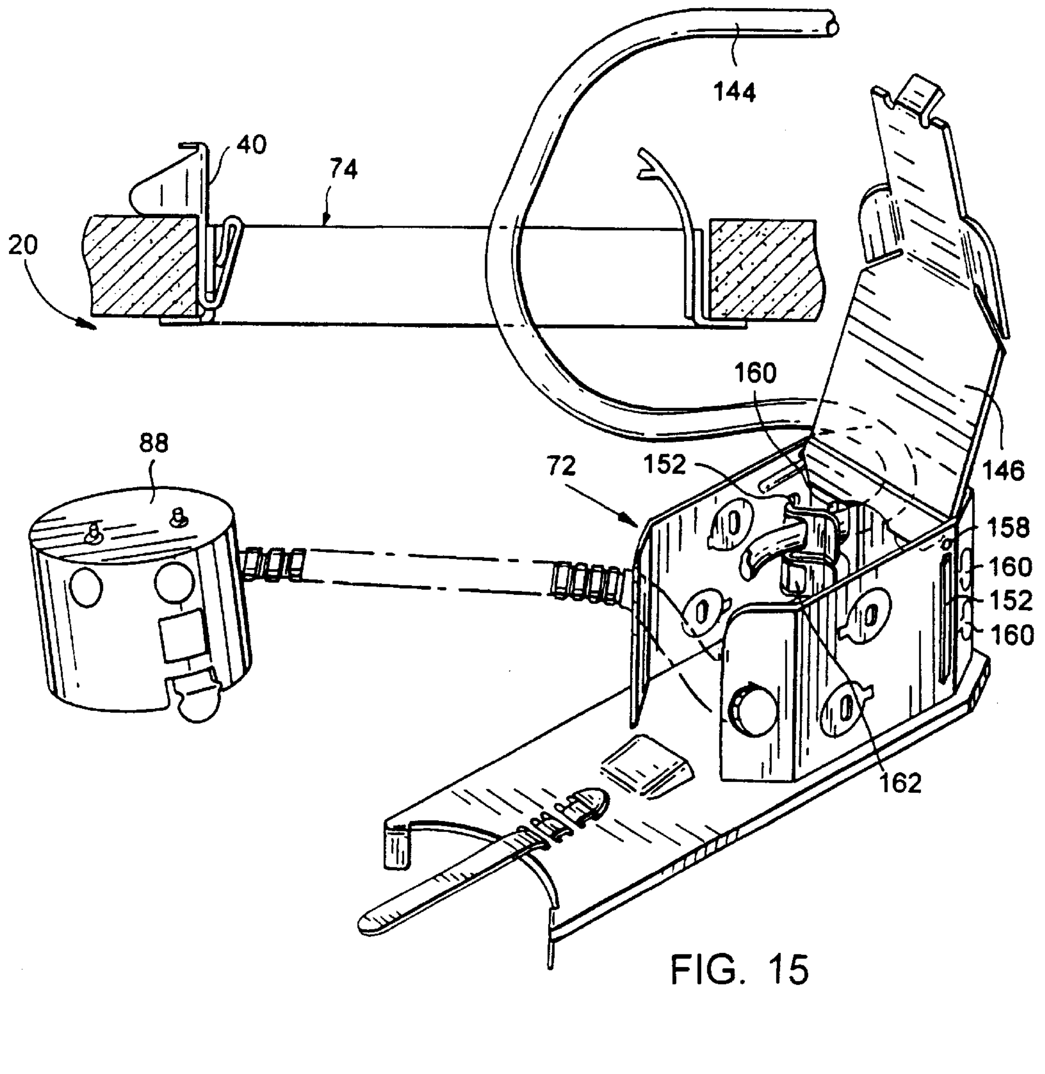

At this point, it should be understood that, due to the flexibility of the system and methods of the present invention, it is possible to install the support structure 20 either before or after the wiring has been installed. Specifically, as shown in FIG. 15, conventional electrical wire 144 to be connected to the junction box 72. This particular connection, as mentioned above, could be accomplished by an electrician before the light fixtures support structure 20 is placed in the aperture 74 in the planar member 52 or it could be accomplished after the light fixtures support structure 20 is placed in the aperture, as will now be discussed.

Figure 17:
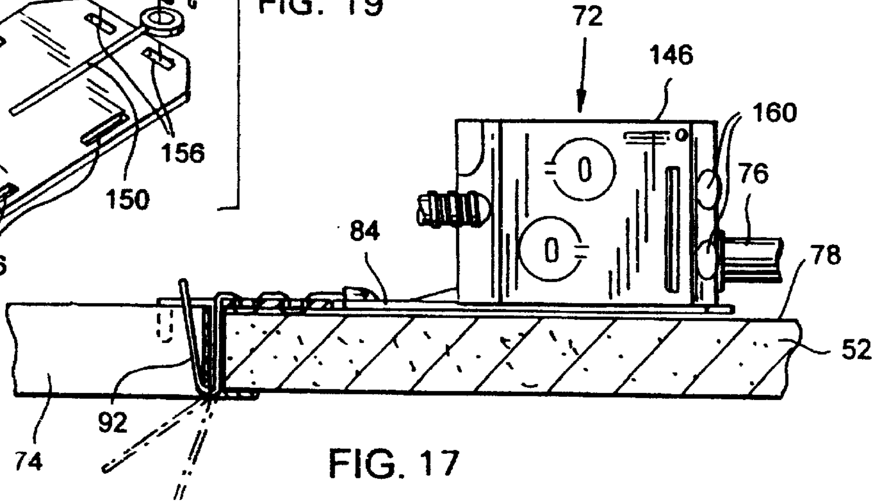

Once the junction box 72 and the connected socket 88 are connected to the electrical wiring 144 and the support structure 20 has been installed in the aperture 74, the junction box tab or tongue 92 is inserted through the most narrow slot 70 in the perimeter member 22 marked, "J-Box", between the planar member 52 and the perimeter member 22 and pulled into position such that the interior surface of each foot 140, 142 of the junction box base plate 84 is properly inserted into the aperture 74 contiguous with the cut edge of the planar member 52, as shown in FIGS. 16 and 17. Once the junction box 72 is properly positioned, the junction box tab 92 is inserted through the narrow slot 70 and pulled down until the junction box plate 84 sits flat on the interior surface of the planar member 52. Then, the tab 92 is bent upward securing the junction box 72 into proper position, as shown in FIG. 17.

Figure 18:
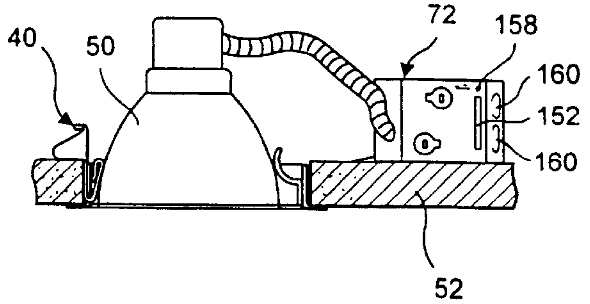

As shown in FIG. 18, after the junction box 72 has been secured to the support structure 20, thereby automatically repeatedly, consistently and predictably positioning the junction box 72 to meet Underwriters Laboratory and code requirements, the socket 88 is attached thereto, as is known in the art, and the trim 50 or the light fixture is then positioned inside the support structure 20.

As mentioned in the background of the invention, no known previous remodeler light fixture support structures had the capability of ready installation into variable thickness planar members and had the capability of being installed in planar members having less than ideal structural integrity or structural capability.

Figure 11A:
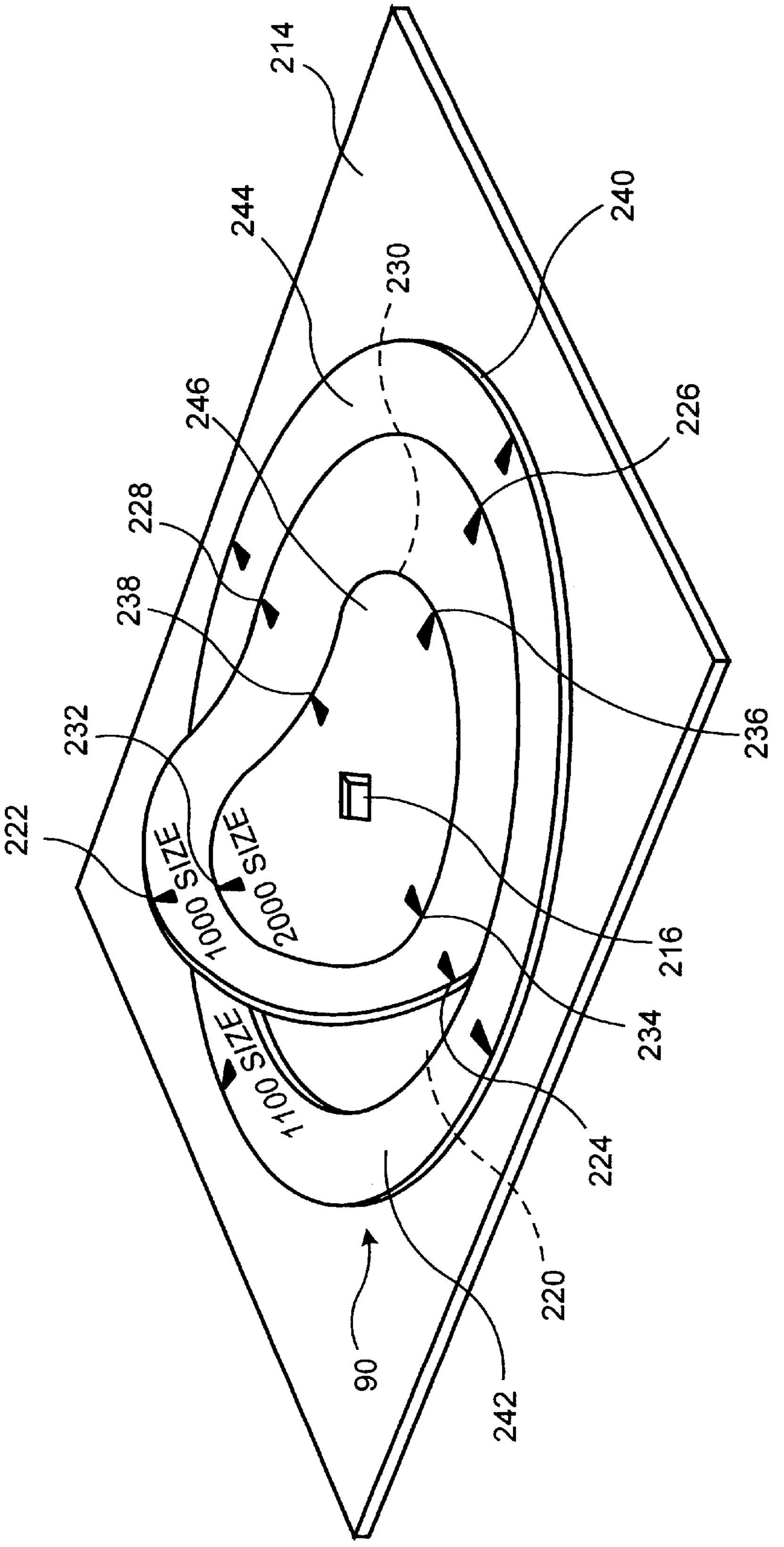
FIG. 11A is a perspective view of the template of FIG. 11 illustrating the separation of the middle and inner portions from the backing and the outer portion of the template.
Figure 11B:
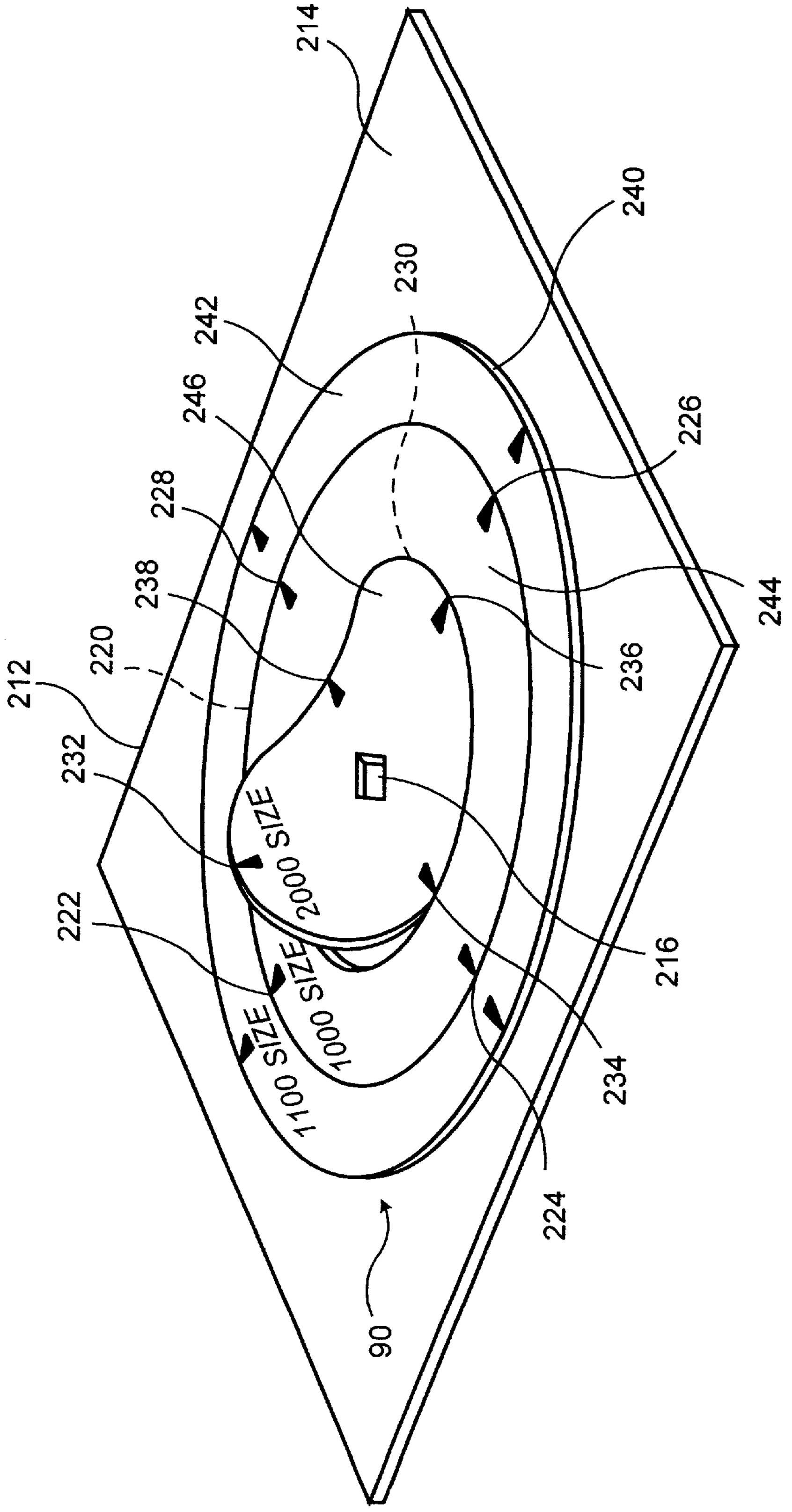
FIG. 11B is a perspective view of the template of FIG. 11 illustrating the separation of the inner portions from the backing and the middle and outer portions of the template.
Figure 12:
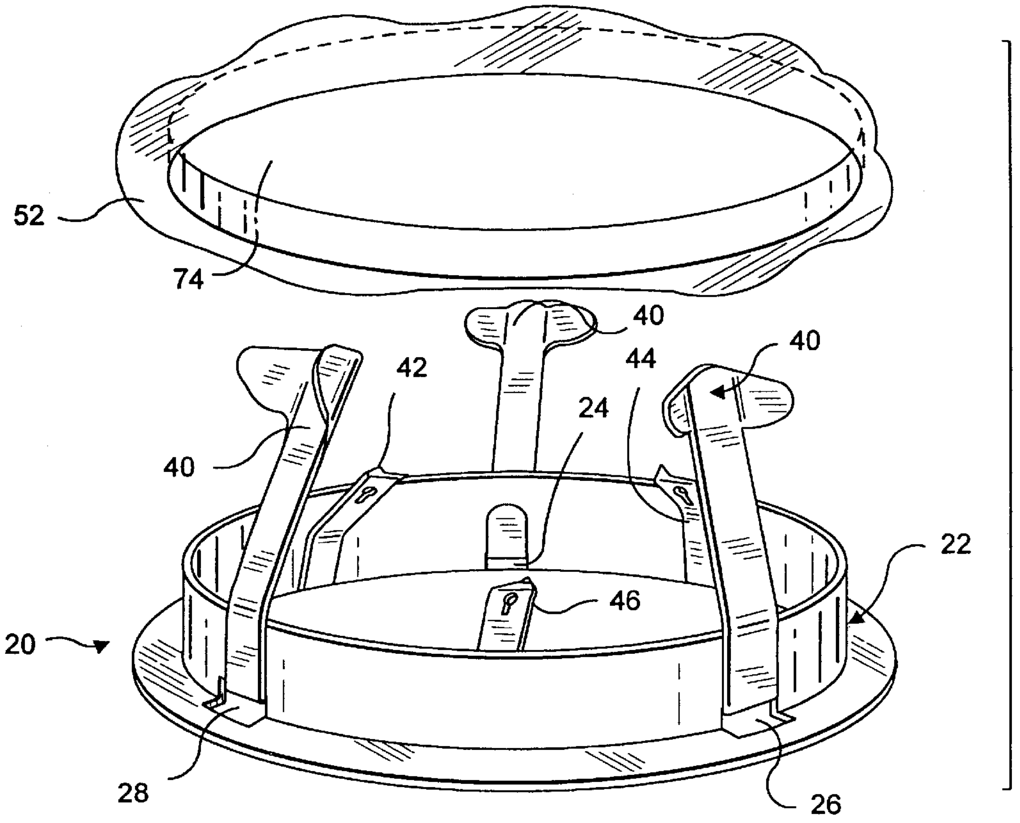
FIGS. 12 through 18 illustrate a sequence in a method according to the present invention.

When using, such as, for example, the representative template 90 illustrated in FIGS. 11–11B, an installer merely separates the template 90 having the adhesive applied on one side thereof from the backing 214. Once separated, the installer locates a mark (not shown) placed on the planar member 52 to indicate the center of the position where it is desired to install a fixture, such as, for example, the remodeler light fixture support structure 20 or other devices, and then positions the side having the adhesive on the planar member 52 with the mark showing through the center hole 216 of the template 90. If the remodeler light fixture support structure 20 to be installed is a size 1,100 fixture, the installer merely cuts about the outer edge 240 of the template 90, as shown. Once completed and the portion of the planar member 52 that has been severed from the planar member 52 is removed forming an aperture, the installation of the fixture support structure is then completed.

If the remodeler light fixture support structure is a size 1,000 fixture, before the proper positioning of the template 90 on the planar member 52, with the template 90 still positioned on the backing 214, the installer separates the inner 246 and middle 244 portions of the template from the backing 214 (See FIG. 11A) leaving the outer portion 242 of the template 90 adhered to the backing. This is accomplished by breaking the webs of material at the first set of perforations 220 and peeling the inner portion 246 and the middle portion 244 of the template 90 from the backing 214 and leaving the outer portion 242 on the backing 214. Next, the inner portion 246 and the middle portion 244 of the template 90 are positioned on the planar surface where the fixture is to be installed. As before, the installer uses a saw or other means to cut the planar member 52 around the outer edge of the middle portion 244 at a radius of about 2$\frac{9}{16}$ inches. Once completed, the severed portion of the planar member 52 is removed thereby forming the aperture 74 in the planar member 52 as above.

If the remodeler light fixture support structure to be installed is a 2,000 size fixture having about a 1$\frac{7}{8}$ inch radius, with the template 90 still positioned on the backing 214, the installer separates the inner 246 portion of the template from the backing 214 (See FIG. 11B) leaving the outer portion 242and middle portion 244 of the template 90 adhered to the backing. This is accomplished by breaking the webs of material at the second set of perforations 230 and peeling the inner portion 246 of the template 90 from the backing 214 and leaving the outer portion 242 and the middle portion 244 on the backing 214. Next, the inner portion 246 of the template 90 is positioned on the planar surface where the fixture is to be installed. Then, as above, once the inner portion 246 has been properly positioned on the planar member 52, the installer merely cuts the planar member 52 using the outer edge of the inner portion 246 to guide a cutting means such that the cut portion of the planar member is severed from the planar member 52.

Once again, it should be understood that the method of using the template is not limited to the described lighting application and that the template described could be used in any application requiring that an aperture of any geometric shape be formed in a planar member. Further, it should be understood that the present invention is not intended to be limited to the representative three portion template shown in the drawings and described above in that the present invention requires only a template having written indicia on one side and an adhesive on the other side. Preferably, the template is adhesively held on a backing member. Finally, it should be understood that the methods described above are not restricted to an installer cutting the planar member using the outer edge of the appropriate portion of the template to guide a cutting means such that the cut portion of the planar member is severed from the planar member and that the inner edge of an appropriate portion could also be used, as would be obvious to those skilled in the art.

Thus, it can be seen that all objectives of the present invention have been met. Specifically, the present invention provides: improved means and methods for positioning and properly sizing an aperture in planar members; improved methods, systems and apparatuses for accurately locating and sizing an aperture in a planar surface; a template having an adhesive means on one side for accurately positioning an aperture in a planar member; a template for marking the position on the surface of a planar member where an aperture is to be cut by adhering to the planar member and a template once adhered to a planar member for guiding an installer in forming an aperture in the planar member.

Changes and modifications in the specifically described embodiments can be carried out without departing from the scope of the invention which is intended to be limited only by the scope of the appended claims.

What is claimed is:

1. A method for forming an opening of a desired size in a planar member comprising the steps of:

a. marking the planar member at the center of the position where the opening is to be cut;

b. utilizing a template comprising a thin material shaped to the dimensions of the desired opening size, said thin material having a front side and a back side having an operatively positioned adhesive coating for releasably securing said template to said planar member, and a central located centering hole;

c. positioning said template such that said centering hole aligns with a location for an opening to be cut in said planar member, and wherein said adhesive coated back side is toward said planar member;

d. securing said template to said planar member by applying pressure to said front side such that said adhesive coated back side contacts and adheres to said planar member;

e. cutting said planar member about an edge of said template creating a section of planar member material separated from said planar member by said cut; and, f. removing said planar member material separated from said planar member by said cut, along with said template adhered thereto.

2. The method for forming an opening of a desired size in a planar member of claim 1, said template front side further having graphic instruction indicia illustrating use of the template.

3. The method for forming an opening of a desired size in a planar member of claim 2, said graphic instruction indicia indicating use of a hole saw to cut the edge of said template.

4. A method for forming an opening of a desired size in a planar member comprising the steps of:

a. marking the planar member at the center of the position where the opening is to be cut;

b. utilizing a template comprising a thin material shaped to the dimensions of a larger opening size, said thin material having a front side and a back side having an operatively positioned adhesive coating for releasably securing said template to said planar member, and a centrally located centering hole, said thin material having perforations creating an interior removable section shaped to the dimensions of the desired opening size and an exterior section;

c. separating said interior removable section from said exterior section;

d. positioning said interior removable section such that said centering hole aligns with a location for an opening to be cut in said planar member, and wherein said adhesive coated back side is toward said planar member;

e. securing said interior removable section to said planar member by applying pressure to said front side such that said adhesive coated back side contacts and adheres to said planar member;

f. cutting the planar member about an edge of said template interior removable section creating a section of planar member material separated from said planar member by said cut; and g. removing said planar member material separated from said planar member by said cut, along with the template interior removable section adhered thereto.

5. The method for forming an opening of a desired size in a planar member of claim 4, said template front side further having at least one perimetric indicia, said perimetric indicia located along said perforations.

6. The method for forming an opening of a desired size in a planar member of claim 4, said template front side further having graphic instruction indicia illustrating use of the template.

7. The method for forming an opening of a desired size in a planar member of claim 6, said graphic instruction indicia indicating use of a hole saw to cut along the edge of said template.

8. A method for forming multiple openings in a planar member comprising the steps of:

a. marking the planar member at the center of each position where openings are to be cut;

b. utilizing a template for each opening to be made, each template comprising a thin material shaped to the dimensions of the desired opening size, said thin material having a front side and a back side having an operatively positioned adhesive coating for releasably securing said template to said planar member, and a centrally located hole;

c. positioning each said template such that said centering hole aligns with a location for an opening to be cut in said planar member, and wherein said adhesive coated back side is toward said planar member;

d. securing each said template to said planar member by applying pressure to said front side such that said adhesive coated back side contacts and adheres to said planar member;

e. reviewing the location of each said template and adjusting said location as appropriate;

f. cutting the planar member about the edges each said template; and, g. removing the planar member materials separated from the planar member by the cuts, along with the templates adhered thereto.

9. The method for forming an opening of a desired size in a planar member of claim 8, said template front side further having graphic instruction indicia illustrating use of the template.

10. The method for forming an opening of a desired size in a planar member of claim 9, said graphic instruction indicia indicating use of a hole saw to cut along the edge of said template.

* * * * *